(12) United States Patent
Huang

(10) Patent No.: US 9,288,419 B2
(45) Date of Patent: Mar. 15, 2016

(54) REMOTE CONTROLLER WITH DUAL POWER SUPPLY UNITS

(71) Applicant: MStar Semiconductor, Inc., Hsinchu Hsien (TW)

(72) Inventor: Hung-Chi Huang, Taichung (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 255 days.

(21) Appl. No.: 13/733,978

(22) Filed: Jan. 4, 2013

(65) Prior Publication Data
US 2013/0176504 A1   Jul. 11, 2013

(30) Foreign Application Priority Data
Jan. 6, 2012   (TW) .............................. 101100662 A

(51) Int. Cl.
| G05B 11/01 | (2006.01) |
| G08C 19/16 | (2006.01) |
| G09B 21/00 | (2006.01) |
| H04N 5/44 | (2011.01) |
| H04L 17/02 | (2006.01) |
| G06F 1/32 | (2006.01) |
| G06F 1/30 | (2006.01) |
| H04N 21/422 | (2011.01) |
| H04N 5/63 | (2006.01) |
| G06F 1/26 | (2006.01) |
| H04N 21/443 | (2011.01) |

(52) U.S. Cl.
CPC .. *H04N 5/44* (2013.01); *G06F 1/30* (2013.01); *G06F 1/3212* (2013.01); *H04N 5/4403* (2013.01); *H04N 21/42222* (2013.01); *H04N 21/42224* (2013.01); *G06F 1/26* (2013.01); *H04N 5/63* (2013.01); *H04N 21/4436* (2013.01); *H04N 2005/4428* (2013.01)

(58) Field of Classification Search
CPC ..................... H04N 2005/4428; H04N 5/4403
USPC ............ 340/12.55, 825.69; 455/352; 341/178
See application file for complete search history.

(56) References Cited

U.S. PATENT DOCUMENTS

| 2002/0126036 A1* | 9/2002 | Flaherty et al. ............... 341/176 |
| 2004/0070277 A1* | 4/2004 | Basso .............................. 307/43 |
| 2008/0291074 A1* | 11/2008 | Tzeng et al. .................. 341/176 |
| 2009/0185081 A1* | 7/2009 | Ueno et al. .................... 348/734 |
| 2010/0164745 A1* | 7/2010 | Migos et al. ............. 340/825.69 |

FOREIGN PATENT DOCUMENTS

| TW | 508968 | 11/2002 |
| TW | I337320 | 2/2011 |

OTHER PUBLICATIONS

Taiwan Intellectual Property Office, "Office Action", Apr. 18, 2014.

* cited by examiner

*Primary Examiner* — Mohamed Barakat
(74) *Attorney, Agent, or Firm* — WPAT, PC; Justin King

(57) ABSTRACT

A remote controller with dual power supply units is provided. The remote controller controls an electronic apparatus. The remote controller includes a housing, a first sub-system and a second sub-system. The first sub-system is disposed in the housing and includes a first power supply unit for powering the first sub-system. The first sub-system further generates a first signal for controlling the electronic apparatus to perform a first operation. The second sub-system is disposed in the housing and includes a second power supply unit for powering the second sub-system. The second sub-system further generates a second signal for controlling the electronic apparatus to perform a second operation.

4 Claims, 3 Drawing Sheets

REMOTE CONTROLLER WITH DUAL POWER SUPPLY UNITS

This application claims the benefit of Taiwan application Serial No. 101100662, filed Jan. 6, 2012, the subject matter of which is incorporated herein by reference.

BACKGROUND OF THE INVENTION

1. Field of the Invention

The invention relates in general to a remote controller, and more particularly, to a remote controller with dual power supply units.

2. Description of the Related Art

A main purpose of designing a remote controller is to control an electronic apparatus at a distance. Taking a television as the electronic apparatus as an example, in the early days, a remote controller for controlling the television is rather simple since a television is intended for displaying television signals only. FIG. 1 shows a schematic diagram of a conventional television remote controller. A remote controller 100 comprises an infrared transmitter 110, a button unit 120 and a power supply unit 160.

The button unit 120 comprises a plurality of operating buttons. A corresponding button signal Sb is generated as a user presses one of the operating buttons. The button signal Sb is transmitted to the television via the infrared transmitter 110, so as to switch between channels, adjust the volume of the television, or to power on or power off the television.

The power supply unit 160 of the television remote controller 100 generally comprises a battery for powering the entire remote controller 100. In the remote controller 100 in FIG. 1, the power supply unit 160 provides power to the button unit 120 and the infrared transmitter 160 only when a user presses an operating button. When no operating button is pressed, the power supply unit 160 does not provide any power to the button unit 120 or the infrared transmitter 110. Therefore, the remote controller 100 in FIG. 1 is extremely power-saving. Assuming the power supply unit 160 comprises two AAA batteries, the remote controller 100 is able to function for at least two years.

Accompanied with technology advancement, a current electronic apparatus, e.g., a television or a video playback device, offers diversified functions. Taking a smart television as an example, the smart television at the same time offers functions of audio input control, cursor control and video games. To fulfill requirements of such electronic apparatus, a remote controller for the electronic apparatus is also necessarily equipped with corresponding control circuits to support the various functions above.

FIG. 2 shows a schematic diagram of another convention remote controller. Taking a smart television as an example, in response to functions of the smart television, a remote controller 200 comprises a button unit 220, an audio control unit 230, a touch control unit 240, a sensor unit 250, a signal transmitting module 210 and a power supply unit 260. The button unit 220 comprises a plurality of operating buttons. As a user presses an operating button of the button unit 220, a corresponding button signal Sb is generated. The button signal Sb is transmitted via the signal transmitting module 210 to the smart television to accordingly control the smart television.

The audio control unit 230 comprises a microphone for converting a user voice to an audio signal Sa, which is transmitted via the signal transmitting module 210 to the smart television to accordingly control the smart television.

The touch control unit 240 comprises a touch panel. Through the touch control function provided by the touch panel, a user is allowed to control the smart television. That is, a touch control signal St is generated as a user touches the touch control unit 240. The touch control signal St is transmitted via the signal transmitting module 210 to the smart television to accordingly control the smart television.

The sensor unit 250 comprises a sensor, e.g., a G-sensor. As a user plays video games, the sensor unit 250 generates a sensing signal Ss. The sensing signal Ss is transmitted via the signal transmitting module 210 to the smart television to accordingly control the smart television to display corresponding images.

In the remote controller 200 in FIG. 2, four control units are taken as an example for explaining diversified functions of a current remote controller. The number of modules in the remote controller may vary according to functions offered by the smart television.

It is apparent from the descriptions above that, all of the control units and the signal transmitting module 210 of the remote controller 200 are powered by the power supply unit 260. However, since certain control units need to be continuously powered or have higher power consumption, power in a battery of the power supply unit 260 can be depleted in a rather short period of time such that the remote controller 200 becomes frequently inoperable.

More specifically, when the power supply unit 260 fails to supply power, the remote controller 200 becomes incapable of controlling the smart television. As a result, the battery in the power supply unit 260 may have to be frequently replaced. The battery of such remote controller generally runs out about every month, and yet the frequent replacement of the battery set brings user inconveniences.

SUMMARY OF THE INVENTION

The invention is directed to a remote controller with dual power supply units. A first power supply unit of the dual supply units is capable of maintaining fundamental control functions requiring low power consumption in the remote controller for a long period of time, so that a situation that the remote controller being completely inoperable due to power depletion of a second power supply unit supporting other control functions requiring higher power consumption is prevented.

A remote controller with dual power supply units is provided. The remote controller controls an electronic apparatus. The remote controller comprises a housing, a first sub-system and a second sub-system. The first sub-system is disposed in the housing and comprises a first power supply unit for powering the first sub-system. The first sub-system further generates a first signal for controlling the electronic apparatus to perform a first operation. The second sub-system is disposed in the housing and comprises a second power supply unit for powering the second sub-system. The second sub-system further generates a second signal for controlling the electronic apparatus to perform a second operation.

The above and other aspects of the invention will become better understood with regard to the following detailed description of the preferred but non-limiting embodiments. The following description is made with reference to the accompanying drawings.

DETAILED DESCRIPTION OF THE INVENTION

In response to diversified functions of an electronic apparatus, a corresponding remote controller is necessarily equipped with control units for controlling the various functions of the electronic apparatus. However, due to high power consumption of the numerous control units, a battery of a power supply unit in the remote controller needs to be frequently replaced.

Taking a smart television as an example, an audio control unit, a touch control unit and a sensor unit of the remote controller need to be continuously powered by a power supply unit. Consequently, these control units quickly deplete the power in the battery of the power supply unit.

According to statistics of user habits, most frequently used functions are switching channels and adjusting the volume of the television and powering on or off the television through a button unit. Control functions of other control units are relatively less frequently used. However, when the power in the battery of the power supply unit is depleted by the less frequently used functions, the fundamental and frequently used functions including switching channels and adjusting the volume of the television as well as powering on or off the television cannot be performed at all.

Figure 2:
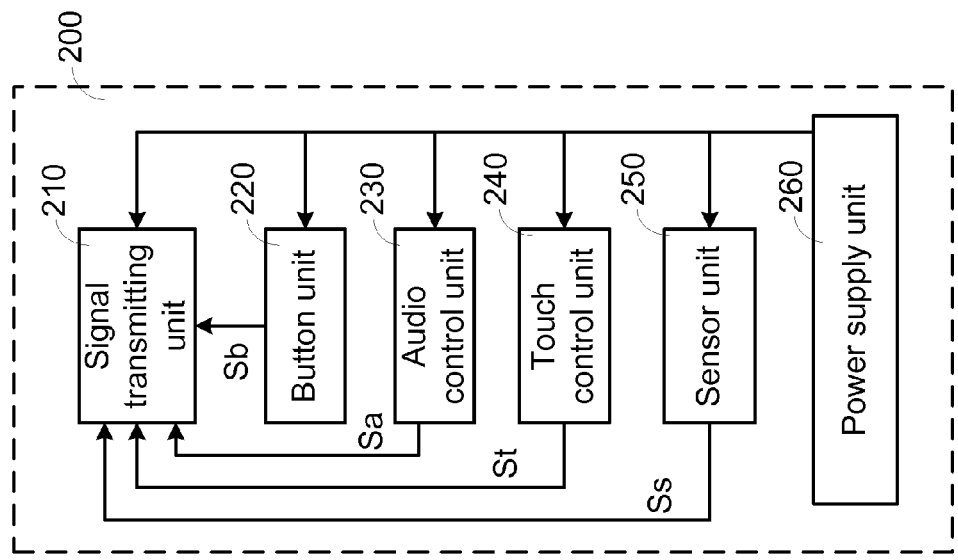
FIG. 2 is a schematic diagram of another conventional remote controller.
Figure 1:
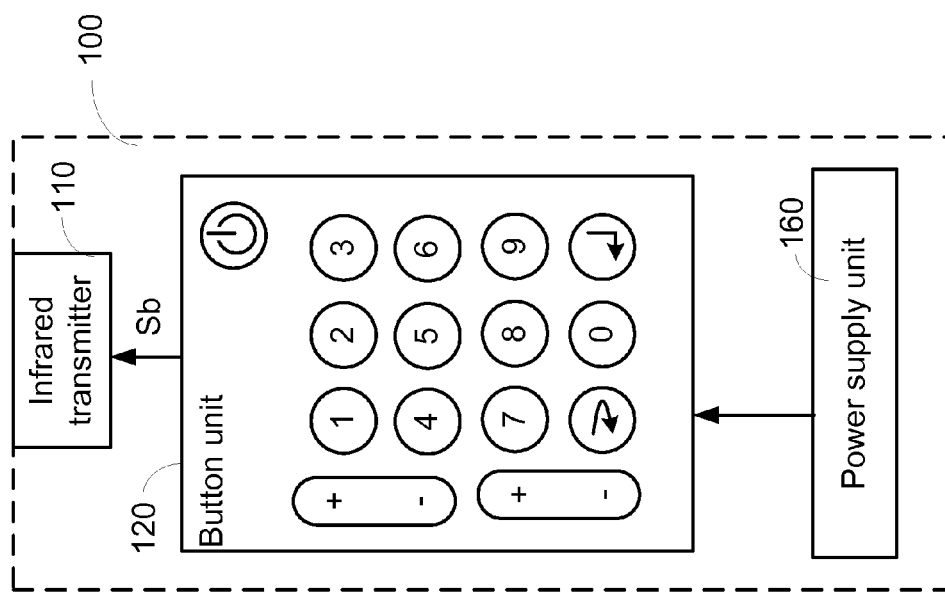
FIG. 1 is a schematic diagram of a conventional television remote controller.
Figure 3:
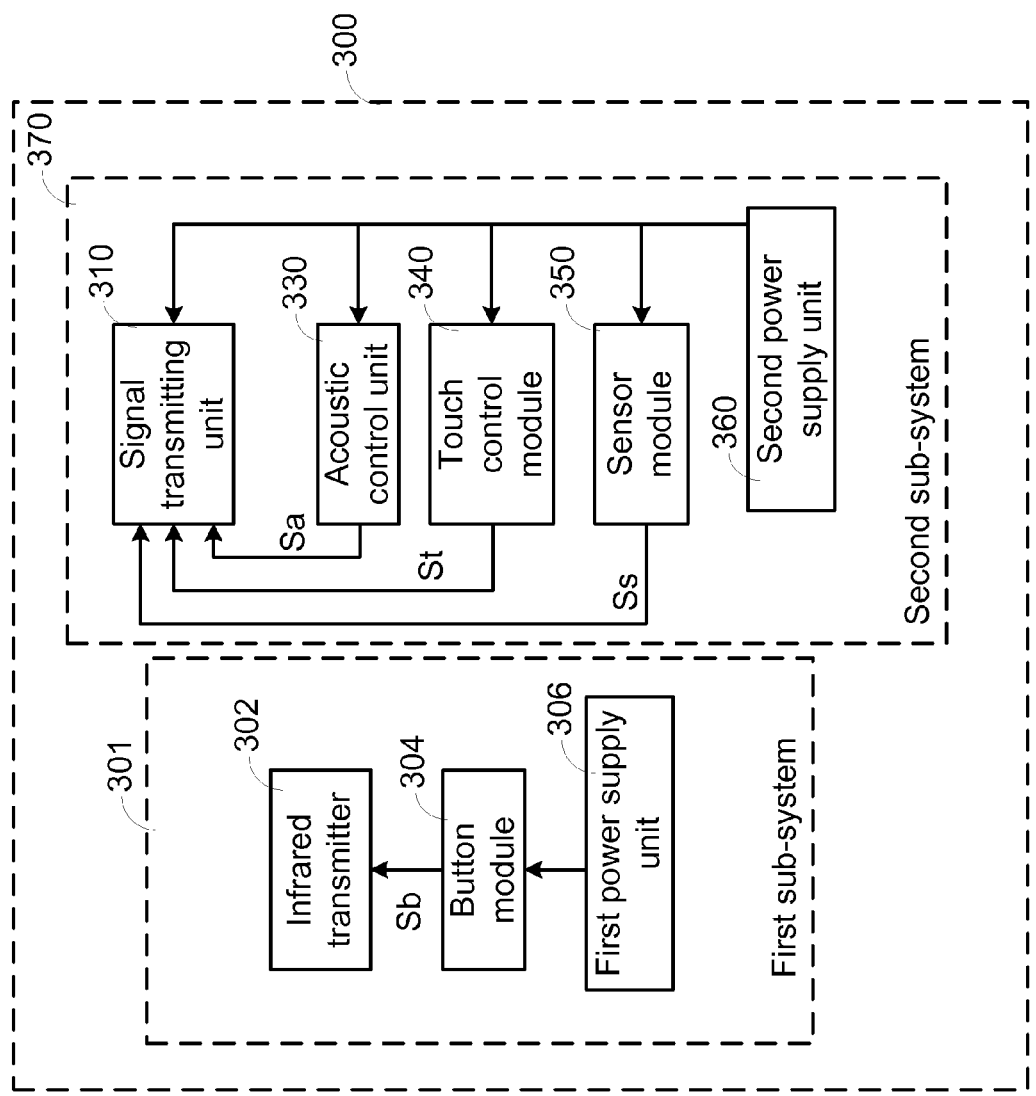
FIG. 3 is a schematic diagram of a remote controller of the present invention.

FIG. 3 shows a schematic diagram of a remote controller of the present invention. According to the present invention, two sub-systems are provided in a housing of a remote controller 300. A first sub-system 301 comprises a button module 304 and an infrared transmitter 302 having low power consumption, and is powered by a first power supply unit 306. A second sub-system 370 comprises an acoustic control unit 330, a touch control module 340, a sensing unit 350 and a signal transmitting module 310 having higher power consumption, and is powered by a second power supply unit 360.

In the first sub-system 301, the button module 304 includes a plurality of operating buttons. A corresponding button signal Sb is generated as a user presses an operating button, and is transmitted to the television via the infrared transmitter 310, so as to switch the channel, adjust the volume of the television, or power on or off the television.

It is apparent that the first power supply unit 306 provides power to the button module 304 and the infrared 302 only when the user presses an operating button. When no operating button is pressed, the first power supply unit 306 does not generate any power to the button module 304 and the infrared transmitter 302. Therefore, the first sub-system 301 is extremely power-saving.

Compared to the first sub-system 301, power consumption of the second sub-system 370 is higher. The second sub-system 370 is powered by the second power supply unit 360. The acoustic control unit 330 comprises a microphone for converting a user sound to an acoustic signal Sa. The acoustic signal Sa is transmitted via the signal transmitting module 310 to the smart television to accordingly control the smart television.

The touch control module 340 comprises a touch panel. Through the touch control function provided by the touch panel, a user is allowed to control the smart television. That is, a touch control signal St is generated as a user touches the touch control module 340, and is transmitted via the signal transmitting module 210 to the smart television to accordingly control the smart television.

The sensor module 350 comprises a sensor, e.g., a gravity sensor (G-sensor). As a user plays video games, the sensor module 350 generates a sensing signal Ss. The sensing signal Ss is transmitted via the signal transmitting module 310 to the smart television to accordingly control the smart television to display corresponding images.

It is concluded from user habits that, a user more frequently utilizes the button module 304 in the first sub-system 301 to control the smart television, whereas functions of the second sub-system 370 are less frequently utilized. Hence, in the present invention, the button module 304, the infrared transmitting module 302 and the first power supply unit 306 are designed in the first sub-system 301, such that power consumption of the power supply unit 306 of the first sub-system 301 is significantly reduced to maintain a long-period power supply. In other words, despite that the second power supply unit 360 of the second sub-system 370 may not be able to provide power, the first sub-system 301 is still capable of providing normal operations. For most users, operation inconveniences are not sensed as long as fundamental functions of the smart television can be controlled through the remote controller.

In another embodiment of the present invention, to maintain a continuous power supply from the second power supply unit, the second power supply unit may further comprise a rechargeable electric device, e.g., a rechargeable battery. That is to say, when the remote controller is not in use, a charging transformer is connected to the second power supply unit so that the power supply duration of the second power supply unit after being recharged may be prolonged.

Figure 4:
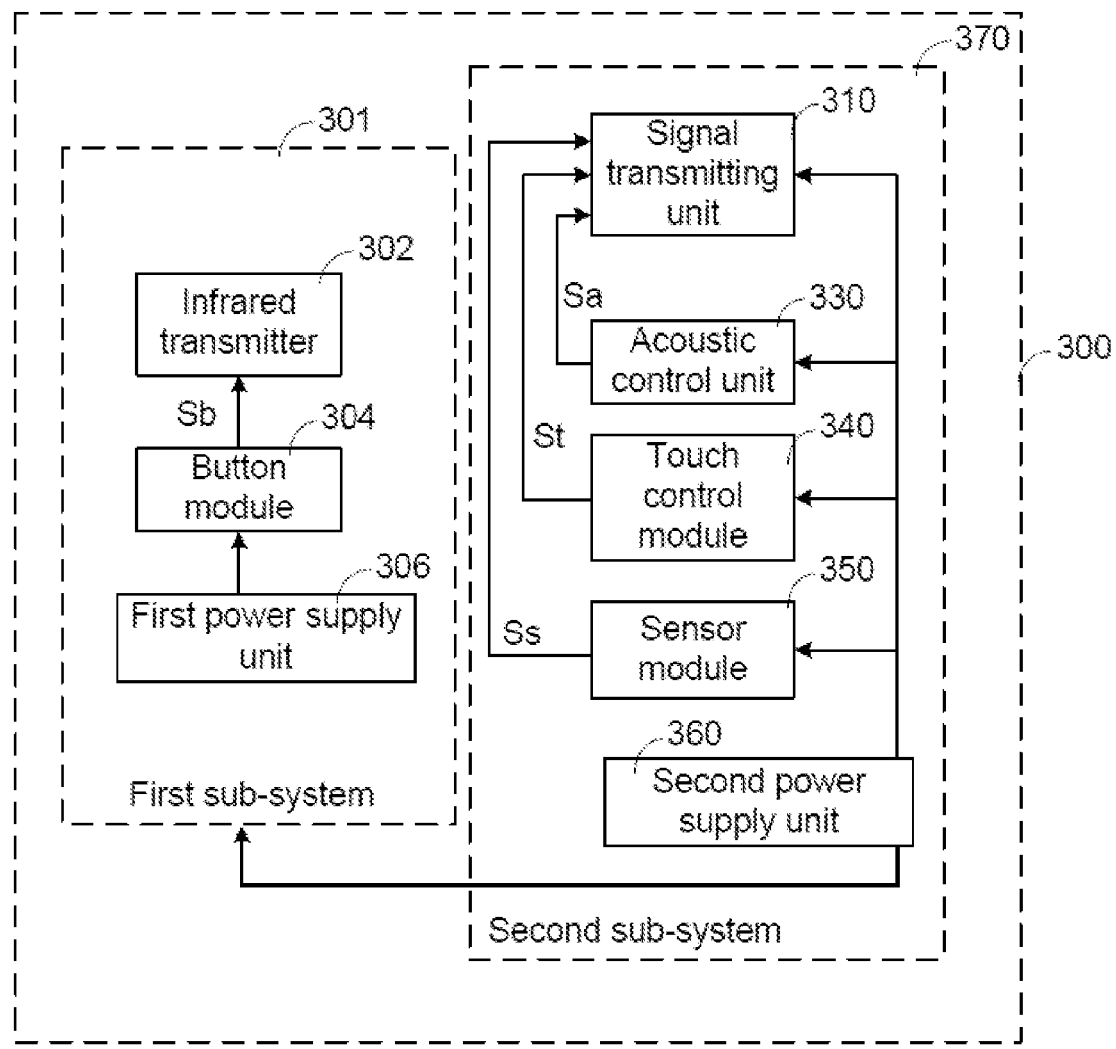
FIG. 4 is a schematic diagram of another embodiment of the remote controller of the present invention.

FIG. 4 shows an alternative embodiment, wherein the second power supply unit 360 is coupled to the first sub-system 301. When the power of the first power supply unit 306 is lower than a predetermined value, the second power supply unit 360 may temporarily replace the first power supply unit 306 to power the button module 304 and the infrared transmitter 302 in the first sub-system 301, so as to maintain normal operations of the first sub-system 301.

Therefore, with the remote controller with dual power supply units provided by the present invention, the first power supply unit is capable of maintaining fundamental control functions requiring low power consumption in the remote controller for a long period of time, so as to prevent the remote controller from being completely inoperable due to power depletion of the second power supply unit by other control functions requiring higher power consumption.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A remote controller, for controlling a television, the remote controller comprising:
    a housing;
    a first sub-system, disposed in the housing, comprising:
        a first power supply, for powering the first sub-system;
        a button module, coupled to the first power supply, comprising a plurality of operation buttons, for generating a first signal for controlling the television to perform a first operation corresponding to one of the operation buttons being pressed; and an infrared transmitter, for transmitting the first signal to the television, wherein said first power supply generates power to the first sub-system only when a button of the button module is pressed; and a second sub-system, disposed in the housing, comprising a second power supply for supplying power continuously to the second sub-system, the second power supply comprising a rechargeable power device, the second sub-system generating a second signal for controlling the television to perform a second operation, wherein the second power supply is coupled to the first sub-system, and powers the first sub-system when a button of the button module is pressed and a power of the first power supply is lower than a predetermined value, wherein when the remote controller is not in use, the second power supply is connected to a charging transformer.

2. The remote controller according to claim 1, wherein the second sub-system comprises:

an acoustic control module, coupled to the second power supply, comprising a microphone for converting an acoustic signal to the corresponding second signal; and a transmitter, for transmitting the second signal to the television.

3. The remote controller according to claim 1, wherein the second sub-system comprises:

a touch control module, coupled to the second power supply, comprising a touch panel, for converting a touch control signal to the corresponding second signal; and a transmitter, for transmitting the second signal to the television.

4. The remote controller according to claim 1, wherein the second sub-system comprises:

a sensor module, coupled to the second power supply, comprising a gravity sensor, for converting a sensor signal to the corresponding second signal; and a transmitter, for transmitting the second signal to the television.

* * * * *